US007952848B2

(12) United States Patent
Whalin et al.

(10) Patent No.: US 7,952,848 B2

(45) Date of Patent: May 31, 2011

(54) INCORPORATING ELECTROSTATIC PROTECTION INTO MINIATURE CONNECTORS

(75) Inventors: Jeffery A. Whalin, Spring Grove, IL (US); Maxwill Bassler, Hampshire, IL (US); Ramon Leon, Streamwood, IL (US); Timothy E. Pachla, Berwyn, IL (US); Stephen J. Whitney, Lake Zurich, IL (US)

(73) Assignee: Littelfuse, Inc., Des Plaines, IL (US)

( * ) Notice: Subject to any disclaimer, the term of this patent is extended or adjusted under 35 U.S.C. 154(b) by 456 days.

(21) Appl. No.: 12/062,854

(22) Filed: Apr. 4, 2008

(65) Prior Publication Data

US 2009/0251841 A1 Oct. 8, 2009

(51) Int. Cl.
*H02H 3/20* (2006.01)

(52) U.S. Cl. ........................................................ 361/127

(58) Field of Classification Search .................. 361/127; 439/181, 607; 338/21

See application file for complete search history.

(56) References Cited

U.S. PATENT DOCUMENTS 4,097,834 A 6/1978 Mar et al.
4,559,579 A 12/1985 Val
4,726,991 A 2/1988 Hyatt et al.
4,813,891 A 3/1989 Walters et al.
4,977,357 A 12/1990 Shrier
5,183,698 A 2/1993 Stephenson et al.
5,256,085 A * 10/1993 Tan et al. .................. 439/607.4
5,262,754 A 11/1993 Collins
5,278,535 A 1/1994 Xu et al.
5,340,641 A 8/1994 Xu
5,674,083 A * 10/1997 Whiteman et al. ............ 439/181
5,820,393 A * 10/1998 Edgley et al. ................ 439/181
5,955,762 A 9/1999 Hively
5,970,321 A 10/1999 Hively
5,973,588 A 10/1999 Cowman et al.
6,191,928 B1 2/2001 Rector et al.
6,214,685 B1 4/2001 Clinton et al.
6,334,964 B1 1/2002 Cowman et al.
6,354,875 B1 * 3/2002 Wu ......................... 439/607.13
6,382,997 B2 * 5/2002 Semmeling et al. .......... 439/181
6,522,515 B1 2/2003 Whitney
6,547,597 B2 4/2003 Harris, IV
6,549,114 B2 * 4/2003 Whitney et al. ................ 338/21
6,693,508 B2 2/2004 Whitney et al.
7,132,922 B2 11/2006 Harris et al.
7,183,891 B2 2/2007 Harris et al.
7,202,770 B2 4/2007 Harris et al.
2002/0050912 A1 * 5/2002 Shrier et al. ................... 338/21
2003/0218851 A1 11/2003 Harris et al.
2006/0152334 A1 7/2006 Maercklein et al.
2008/0096429 A1 4/2008 Mikolajczak et al.

* cited by examiner

*Primary Examiner* — Stephen W Jackson
*Assistant Examiner* — Angela Brooks
(74) *Attorney, Agent, or Firm* — Kacvinsky Daisak PLLC

(57) ABSTRACT

Electrostatic discharge protection, also known as ESD protection, is provided in the form of a discrete array with a voltage variable material (VVM) or a VVM device. The array is fabricated with a common electrode for connection to ground, and one or more electrodes configured for connection to an electrical component. The electrical component is a connector attached to an electrical circuit containing devices subject to damage by ESD events. The array is placed into a pocket or space on the connector and is held in place mechanically by spring force or by soldering to leads or electrodes of the connector. The array may be soldered to a ground connection or held in place by pressure, such as from a spring or from an outer housing or shell. In some embodiments, the array is removable from the component without affecting component circuits other than removal of ESD protection.

25 Claims, 9 Drawing Sheets

INCORPORATING ELECTROSTATIC PROTECTION INTO MINIATURE CONNECTORS

BACKGROUND

The field of the invention is electrostatic discharge (ESD) protection, and the provision of ESD protection to miniature connectors and connection devices. More particularly, the invention relates to discrete miniature connection devices for protection against ESD associated with human and structural discharges to electrical circuits (hereafter collectively referred to as ESD).

Connectors and printed circuit (PC) boards have found increasing application in electrical and electronic equipment of all kinds. The electrical circuits formed within connectors or on printed circuit boards, like larger scale, conventional electrical circuits, need protection against electrical overvoltage. This protection is typically provided by commonly known ESD devices that are physically secured to the PC board.

Examples of such devices include silicon diodes and metal oxide varistor (MOV) devices. However, there are several problems with these devices. First, there are numerous aging problems associated with these types of devices, as is well known. Second, these types of devices can experience catastrophic failures, also as is well known. Third, these types of devices may burn or fail during a short mode situation. Numerous other disadvantages come to mind when using these devices during the manufacture of a PC board.

It has been found in the past that certain types of materials can provide protection against fast transient overvoltage pulses within electronic circuitry. These materials at least include those types of materials found in U.S. Pat. Nos. 4,097,834, 4,726,991, 4,977,357, and 5,262,754. However, the time and costs associated with incorporating and effectively using these materials in microelectronic circuitry is and has been significant. In addition, these devices tend to have an ESD protection device located far away from possible points of origin of the ESD event, thus allowing for propagation of an overstress or an arc for a considerable distance before the overstress can be shunted to ground. It would be desirable to place the overstress material and shunt near a point of origin of the stress.

While this would be desirable, placing a relief and a shunt is difficult because of the ever-decreasing physical scale and ever-smaller dimensions of electrical devices. Present day designs must incorporate the highest amount of performance possible into the very smallest space available. This leaves little room for even such an important feature as ESD protection. It would be desirable if the ESD protection could be added without changing the design of the electrical device that is being protected. That is, it would be desirable if the ESD protection could be added in an almost modular fashion, with very little or no change to the electrical device which is being protected. The present invention is provided to alleviate and solve these and other problems.

SUMMARY

One embodiment is a method for manufacturing a connector. The method includes steps of forming a plurality of electrodes and insert molding the plurality of electrodes into an insulative body having a pocket. The method also includes a step of forming a discrete electrostatic discharge (ESD) protective array, the protective array including an insulated carrier, a plurality of contacts, and a ground conductor, wherein the plurality of contacts is connected to the ground conductor through a plurality of gaps filled with a voltage variable material (VVM) or a VVM device. The method then includes steps of inserting the protective array into the pocket, and attaching the protective array to the plurality of electrodes to form a connector by placing the array and the body in a conductive housing, the array held in contact with a ground conductor by a spring-loaded or pressing connection.

Another embodiment is a method of forming an array. The method includes steps of forming an insulative housing, forming a ground conductor on a first portion of the housing, and forming a plurality of contacts on a second portion of the housing, wherein the plurality of contacts are separated from the ground conductor by a plurality of gaps. The method also includes step of filling the plurality of gaps with a VVM or a VVM device, and, if a VVM is used, curing the VVM, wherein the array is configured for modular insertion into an electrical device to provide ESD protection, the plurality of contacts configured for touching but not penetrating contact with leads of the electrical device.

Another embodiment is an electrical circuit protection device. The electrical circuit protection device includes an electrically insulating substrate, at least one first electrical contact disposed on the substrate, and a plurality of second electrical contacts disposed on the substrate, the plurality of second electrical contacts being spaced apart from the at least one first electrical contact to form a plurality of gaps. The electrical circuit protection device also includes a VVM or a VVM device disposed in the plurality of gaps, the VVM or VVM device connecting the at least one first electrical contact to the plurality of second electrical contacts, wherein the electrical circuit protection device forms a discrete unit suitable for removable assembly into an electrical device to protect at least one circuit, the electrical circuit protection device configured for touching but not penetrating contact with a lead of the at least one circuit.

Another embodiment is an electrical circuit protection device. The electrical circuit protection device includes a substrate, first and second electrodes disposed on the substrate and spaced apart from one another to form a gap, and a VVM or a VVM device disposed on the substrate in the gap, the VVM pr VVM device connecting the first electrode to the second electrode, wherein the electrical circuit protection device forms a discrete unit suitable for removable assembly into a pocket of an electrical device to protect at least one circuit connected to the electrical device, wherein the electrical circuit protection device is configured for connection to the at least one circuit or to a ground by a pressure connection.

Another embodiment is an electrical circuit protection device. The device includes an electrically insulating substrate, a first common electrode disposed on the substrate, a plurality of second electrodes disposed on the substrate and spaced apart from and confronting the first common electrode to form a plurality of gaps, and a VVM or a VVM device disposed on the substrate in the plurality of gaps and connecting the first common electrode to the plurality of second electrodes, wherein the electrical circuit protection device is configured as a discrete device for insertion into and removal from an electrical component without affecting a fit or a function of the electrical device other than protection of the plurality of circuits.

Additional features and advantages are described herein, and will be apparent from the following Detailed Description and the figures.

DETAILED DESCRIPTION

There are many embodiments of the invention, of which only a few are described herein. Many more will be apparent to those with skill of the art using the examples herein. As noted above, it would be desirable if ESD protection could be added to an electrical device, for instance as a retrofit or conversion, while requiring little or no change in the electrical or physical design of an electrical device for which protection is sought. In general, such a design would require only placing the overstress protection adjacent or in touching contact with electrical conductors likely to encounter ESD. Such a design would not require physical penetration of an electrical conductor or electrode through the protective device. An example is U.S. Pat. No. 5,278,535, in which a laminate is placed in penetrating contact with a series of pins of a connector. The laminate itself requires changing the design of the connector, in that the connector housing and pins must now be tall enough to accommodate the height of the laminate.

For example, requiring a penetration or a penetrating contact at the very least requires consideration of height build-up and a tolerance stack-up of the additional parts in which penetration occurs. This could significantly alter the design and manufacture of small parts, such as connectors, small circuit boards, small flex circuits, and so forth. Adding ESD protection is desirably accomplished without changing the overall design of the part, but rather only minimally impacting the electrical and mechanical design. VVMs normally have very high electrical resistance or impedance at normal operational voltage levels. For example, a typical gap of a few thousandths of an inch filled with a VVM will have a resistivity on the order of $10^9$ ohms or more. This resistance is large compared to the normal path for the electricity, which is normally a closed path with significantly lower resistance. In general, a VVM-filled gap device may be modeled as a very low capacitance to ground which is of no consequence under normal circuit operation. When an ESD condition occurs, the VVM becomes very conductive, e.g., less than 100 ohms, for a short period of time, allowing relief from the ESD by safely shunting the ESD to ground.

Fabrication of an ESD array

Figure 1A:
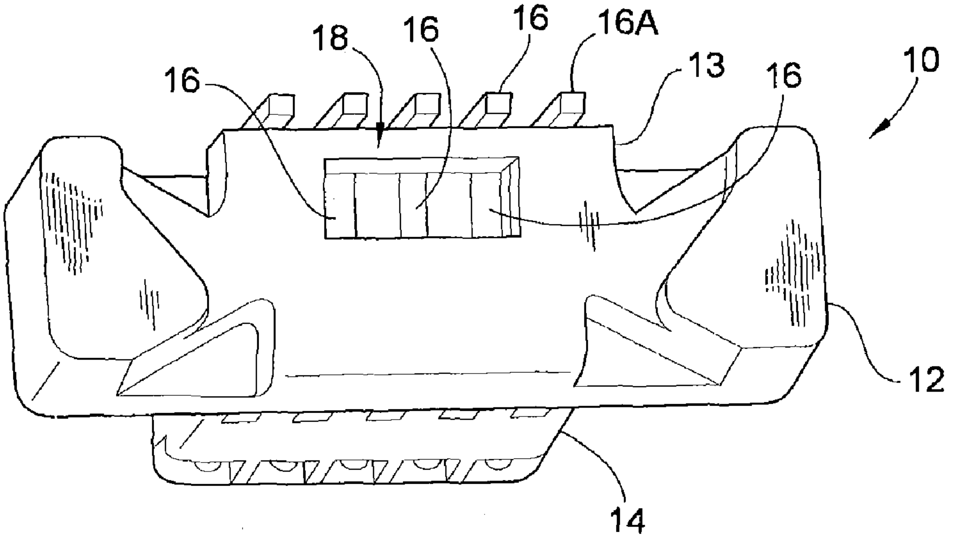
FIGS. 1A and 1B are rear and front perspective views of a micro-USB connector configured for assembly to an electrical circuit protection device, with the shield removed for clarity.
Figure 1B:
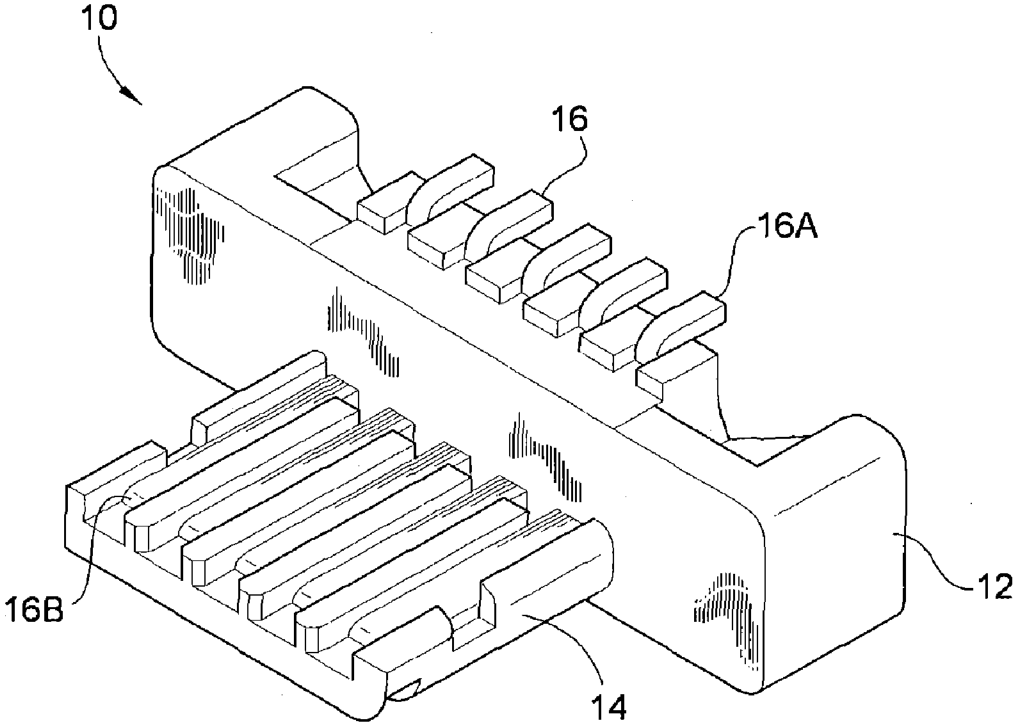

A connector is an example of an electrical component in which protection can be incorporated to protect electronic devices, e.g., integrated circuits within a piece of equipment such as a cell phone or an MP-3 player. A portion of a micro-USB (universal serial bus) connector incorporating such ESD protection is depicted in FIGS. 1A and 1B. To form this portion of the connector 10, an array of electrodes or conductors 16 is typically placed into an insert injection molding tool. The injection mold incorporates internal features that accurately position and hold these electrodes or conductors as the mold is closed and an injection cycle is run. The body 12 is thus molded around the electrodes 16. The body 10 along with shell 30 forms a complete micro-USB connector.

The upper surfaces of electrodes 16 rear portions 16A visible in FIG. 1A are placed and configured to connect to a printed circuit board (PCB) or other device. The front portion 14 and the opposite portion 16B of the electrodes 16 visible in FIG. 1B are configured for connection to a plug, for example, a micro-USB plug. Electrode rear end portions 16A terminate near a rear 13 of the body 12, which also includes an open window or pocket 18.

As also seen in FIG. 1B, the electrodes 16 are roughly S-shaped, and extend through body 12 from rear side 13 to the opposite, front side 14. In one embodiment, the electrodes are tin-plated copper or a tin-plated copper alloy. The electrodes have two ends, an end 16A with upper surfaces for connection to a printed circuit board or other device, and a second end 16B with surfaces for connection to a plug, such as a USB plug. It is understood that this or other configurations may be applied to any desired connector. When the connector 10 and shield 30 are assembled to the ESD array, described below, heat may be used to reflow solder or otherwise join the array to a portion of the electrodes 16 visible in window 18. The heat travels through the short portion 16A of the electrodes 16 in the rear of the connector, to the portion of the electrodes visible in the window 18, as seen in FIG. 1A. As seen in FIGS. 1A and 1B, this may be a relatively short path. Alternatively, the connection may be left unsoldered as a pressure connection only.

In this example, there are five leads or electrodes 16, which may be used for a V+ line, a digital ground line, an identification line, and two data lines. Other embodiments may have other uses for the electrodes and the lines. Some embodiments may provide ESD protection for all five lines, while others may wish to protect only the identification line and the two data lines. Other embodiments may have different protection needs. Note that the window 18 discussed above in FIG. 1A allows for contact between the electrodes 16 and the array discussed below with respect to FIGS. 2A and 2B. The array is fabricated separately and assembled into the window, as discussed below.

Figure 2A:
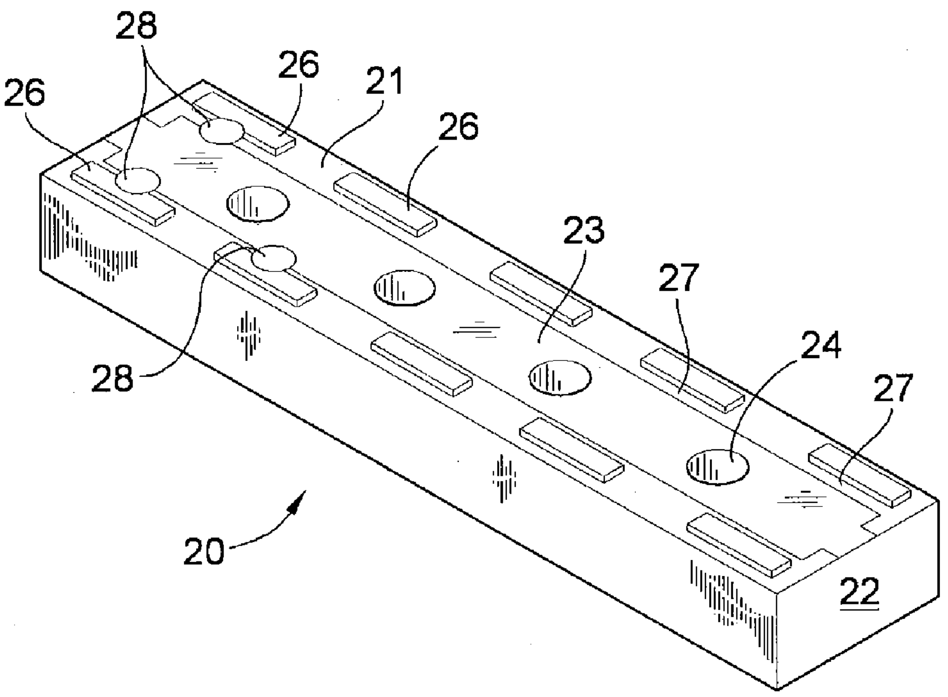
FIGS. 2A and 2B are front and rear perspective views of a first embodiment of an electrical circuit protective device.
Figure 2B:
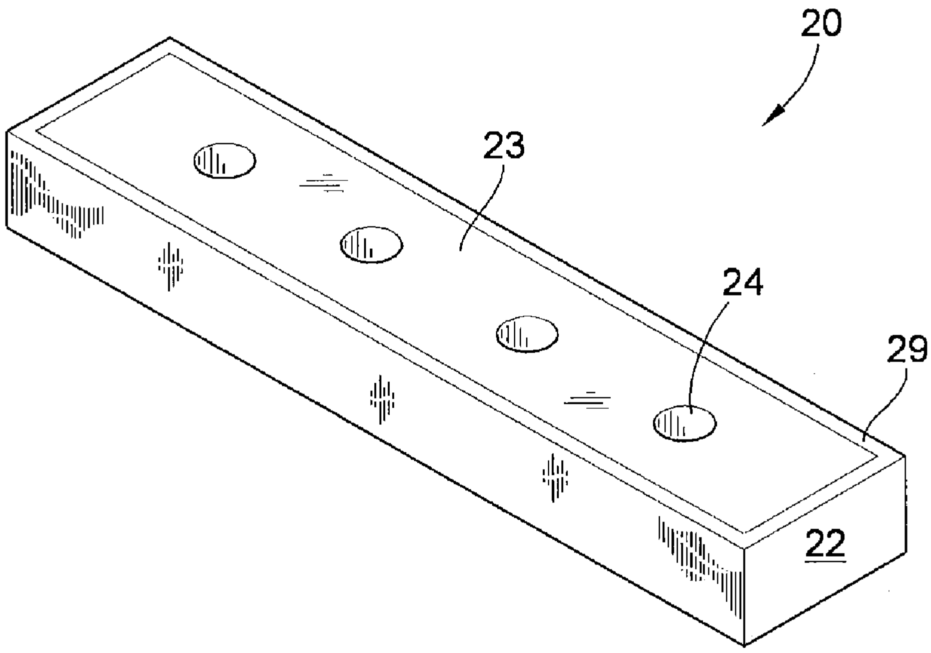

FIGS. 2A and 2B depict an electrical circuit protection device, or an ESD-protective array 20. The electrical circuit protection device 20 includes an insulative body 22 with copper conductor 23 on the top side 21, as shown in FIG. 2A and on the bottom side 29 as shown in FIG. 2B. The copper on the top and bottom sides is connected through one or more plated-through-holes (PTH) or vias 24. Thus, the top 21 and bottom 29 sides are electrically connected at all times. Connection to ground is made to the bottom side 29 by pressing or attaching a ground conductor to the conductive surface. The electrical circuit protection device 20 is fabricated as a single, unitary, discrete device, in the sense of a separate and individual distinct entity or part. Thus, after electrical circuit protection device 20 has been fabricated, it may be picked up and placed into any desired and properly configured electrical device, such as the connector shown in FIG. 1A, to provide ESD protection.

Besides copper or other plating, a pathway to ground may be accomplished by applying a conductive adhesive, such as conductive epoxy paste or film. Other films may also be used, such as an anisotropic conductive film (ACF). An ACF is designed to conduct electricity only through its depth due to strategic placement of small conductive elements that align in the depth direction, which thus has a low resistance, rather than across its width or length, which has higher resistance. ACFs are available from the 3M Company, St. Paul, Minn., U.S.A. Other conductors, such as filled silicone, may also be used to conduct an ESD to ground, thus protecting an electrical device.

The top side 21, as shown in FIG. 2A, is intended to be the side first inserted into the pocket 18 of FIG. 1A. The top side 21 of the array 20 includes a five sets of raised pads 26, each set including one pair of pads 26 on each periphery of the top side 21. The pads are formed by attaching discrete conductors, by selectively plating the ten pads onto the surface, or by forming solder bumps in the selected locations. The pads 26 are not directly connected to the copper plating 23. Instead, there is a gap 27 between the copper conductor 23 and each of the pads 26.

Gap 27, which may be horizontal, vertical, or both, is intended to be filled with a small portion 28 of VVM. The VVM is then cured and a conformal coating (not shown) is applied over the VVM. Conformal coatings are described at least in U.S. Pat. No. 5,974,661, assigned to the assignee of the present patent, and is hereby incorporated by reference in its entirety and relied on. Note that array 20 may be removably assembled into the window 18 of FIG. 1A if the pads are plated or if the solder bumps are not re-flowed to make a firm connection. If the array is soldered to the electrodes, the assembly may still be reversed by heating the array and removing it from the soldered connection without destroying the electrodes 16 or connector 10.

A VVM has electrical properties of very high resistance at a low applied voltage or current, and very low resistance at a high applied voltage. VVMs are typically composite materials with a polymeric matrix and one or more filler materials, which may be insulative, semi-conductive, or conductive. VVMs are described in several patents assigned to the assignee of the present patent. These patents include the following, each of which is hereby incorporated by reference in its entirety and relied on, U.S. Pat. Nos. 4,813,891; 5,183,698; 5,278,535; 5,340,641; 6,191,928; 6,547,597; 6,693,508; 7,183,891; and 7,202,770. In other embodiments, a protective array may be formed simply by inserting an appropriately-sized voltage variable tape, also known as SurgX™ conductive material, which also has properties of high resistance at low voltage and low resistance at high voltage. The tape may be used in conjunction with a substrate, such as a metal or conductive plate, that provides the appropriate thickness and ground connections, as described above for array 20. These tapes are described in greater detail in U.S. Pat. Nos. 5,955,762 and 5,970,321, which are hereby incorporated by reference in their entirety and relied upon.

Figure 3:
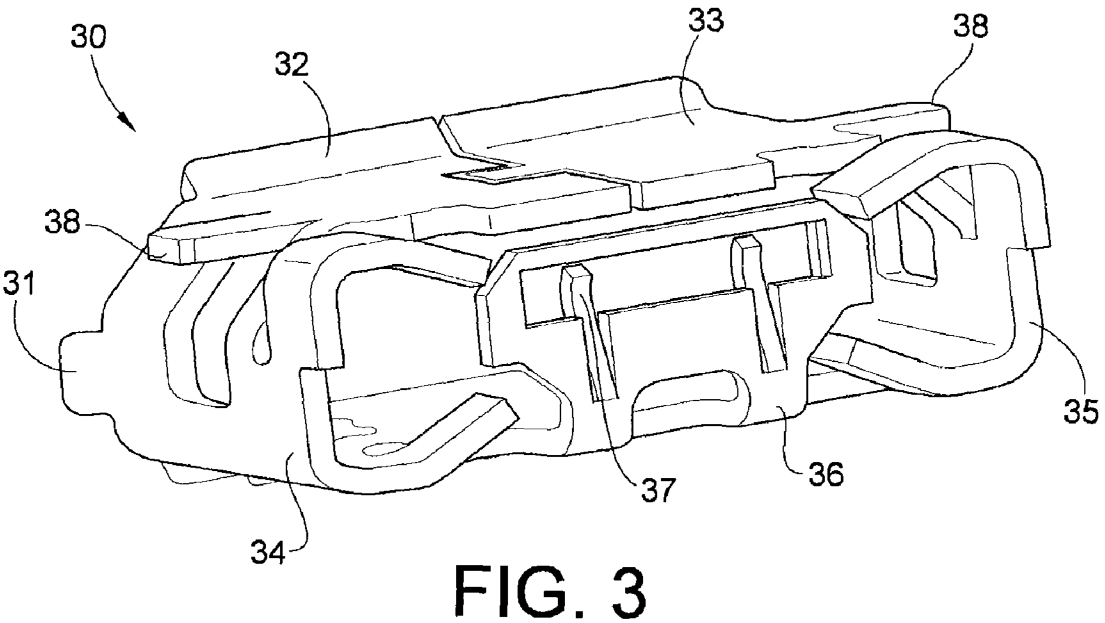
FIG. 3 is a perspective view of a conductive housing or shield for a protected electrical device.

The array 20 is configured for assembly into the connector body 10, the two intended for assembly with conductive housing or shield 30, as shown in FIG. 3. The housing 30 is stamped from a single piece of metal 31, such as tin-plated stainless steel, and pierced, blanked and formed as shown.

The top side includes a portion 32 with a slot and a second portion 33 with a tab mating to the slot for closure of the housing. The left and right sides 34, 35 may have tabs as shown which serve as insertion guides for the mating plug. The back side 36 is formed as shown and includes two inwardly-leaning tongues or springs 37 formed from the same piece of metal 31. The springs 37 urge the array 20 into contact with electrodes 16 within pocket 18 while completing the electrical circuit path to ground through springs 37 and tabs 38. Tabs 38 on top connect to pads (not shown) on a circuit board or other device to provide the electrical ground for ESD protection.

Figure 4:
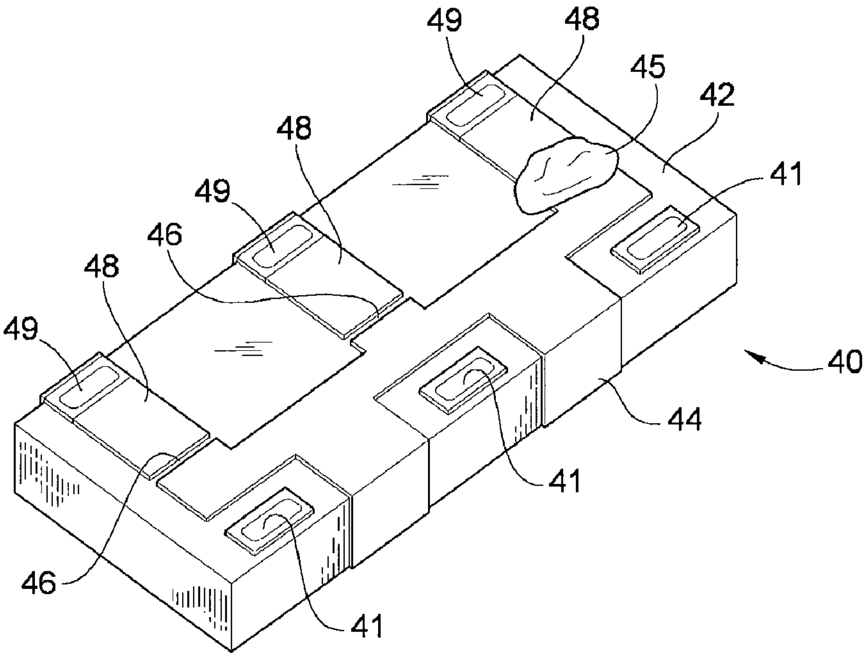
FIG. 4 is a top perspective view of a second embodiment of an electrical circuit protection device.

A second embodiment of an array or module for ESD protection is shown in FIG. 4. Module 40 includes an insulative body 42, which may be plastic, FR-4, ceramic, glass-ceramic, or other insulative body. Module 40 includes two sets 41, 49 of raised pads. The first set 41 of raised pads is not electrically connected, but serves merely to insure a level top, as will be explained below. The second set 49 includes three separated pads that are atop a series of conductors or traces 48. Traces 48 may be copper, aluminum or other conductive metal. A wrap-around ground 44 is plated onto body 42 to serve as a ground in the case of an ESD event. Traces 48 are separated from ground 44 by gaps 46 for VVM material 45 as shown.

In one way of practicing the invention, the module is manufactured by starting with a block or sheet of insulative material 42. Traces 48 and wrap-around group 44 are plated onto the block as a unitary material, and the gaps 46 are formed later by cutting, etching, or otherwise removing metal. The sets 41, 49 are then formed by one or more steps of plating. In other methods, solder bumps, solder pads, or other conductive materials are formed in the areas shown. The VVM material 45 is then placed in the gaps by a liquid or paste dispensing machine and cured. A conformal coating 43 may then be placed atop the VVM. The conformal coating 43 is then cured, either after forming or after assembly into a connector which has been designed to accept module 40 for ESD protection of the connector. As discussed below, VVM devices, such as varistors, may also be used in place of the VVM material itself.

Figure 5:
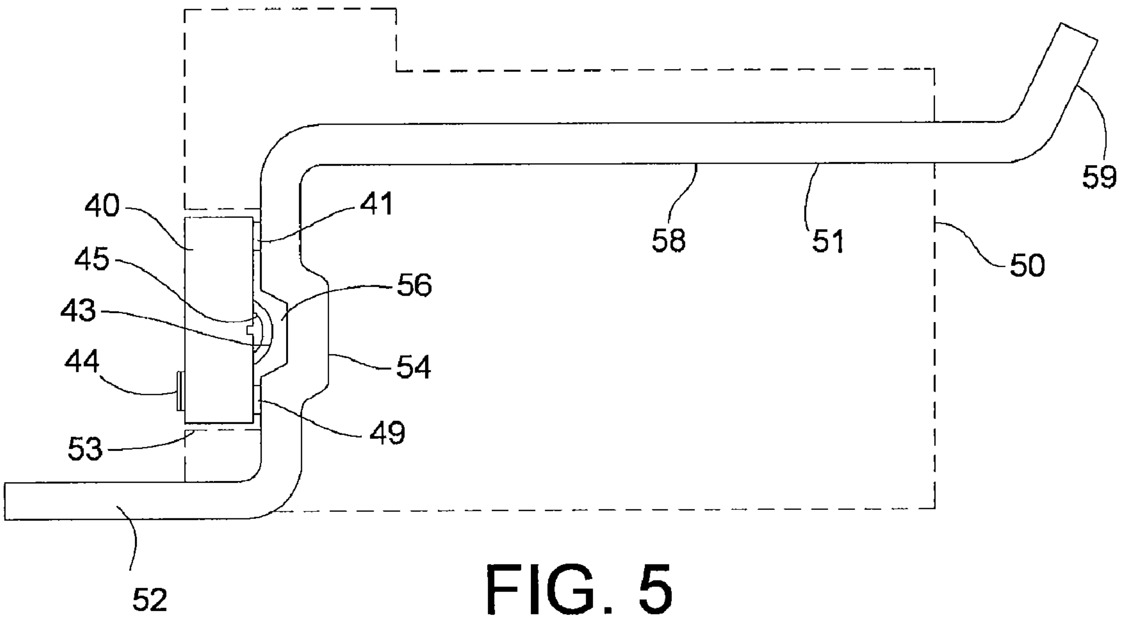
FIG. 5 is a side view of the electrical circuit protection device of FIG. 4 assembled to an electrical device.

Array 40 is designed for placement in a pocket of a connector or other device, as shown in the spatial arrangement of FIG. 5. In this drawing, array 40 is placed in a pocket 53 of a connector body 50, the connector body including at least one conductor or electrode 51. The electrode is made of a conductor, such as tin-plated copper, or a tin plated alloy of copper. The electrode is formed with a shorter portion 52 for connection to a printed circuit board of a cellular telephone, MP-3 player, or other small, portable electrical or communication device. The longer portion includes a straight portion 58 parallel to the short portion 52, with an end portion 59 formed at an angle to the straight portion for ease of assembly into a connector, and intended to mate with, for example, a USB plug. Other applications may also use array 40 and connector body 50 with one or more electrodes.

The electrode 51 also has a central portion 54, perpendicular to the short and straight portions 52, 58. The central portion 54 includes a gap 56, the gap designed so that pocket 53 and array 40 are centered on gap 56. In this way, working pads 49 are placed in contact with electrode 51, while spacing pads 41 serve to keep array 40 level and aligned in the pocket. The array is placed generally parallel to the central portion of the electrode, between shorter PCB-connecting portion 52 and cable-connecting portion 59. The advantage of the array or module in this design is that the protective array is placed directly on the connector. If an ESD event is coupled to the connector end 59, the ESD array is located adjacent the circuit board connector portion 52 and can immediately shunt the excess voltage or current to ground 44.

Figure 6:
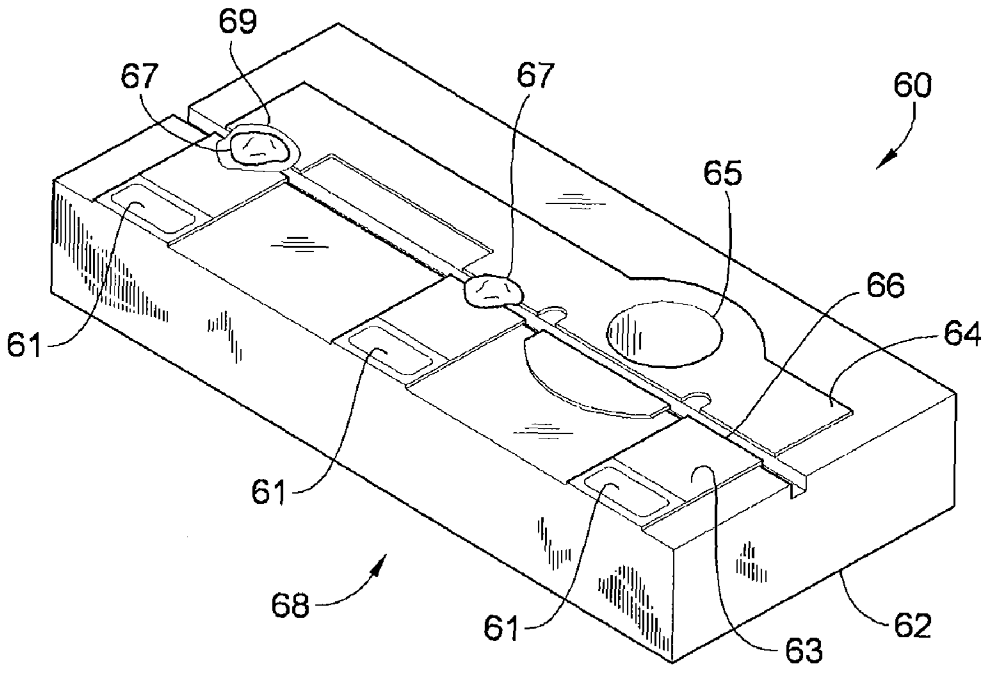
FIG. 6 is a top perspective view of a third embodiment of an electrical circuit protection device.
Figure 7:
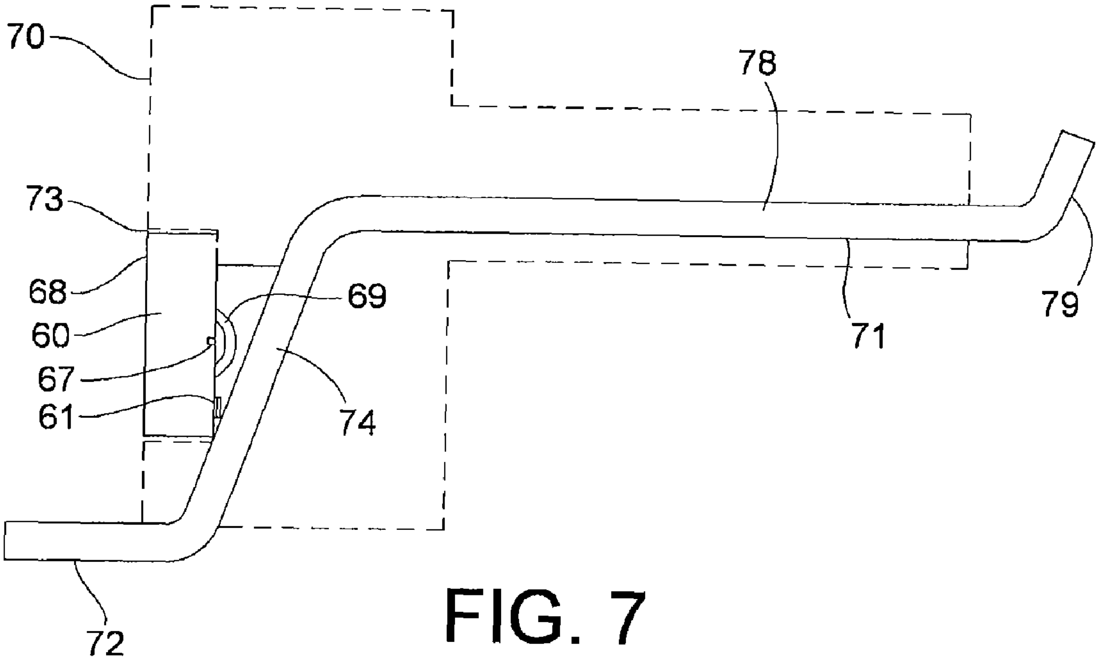
FIG. 7 is a side view of the electrical circuit protection device of FIG. 6 assembled to an electrical device.

Another embodiment of an array and an application for the array is depicted in FIGS. 6-7. An ESD array 60 includes a series of conductive pads 61, the pads mounted on an insulative body 62 and a series of traces 63. The traces 63 are separated from a grounding strap 64 by a series of gaps 66 in the traces. The grounding strap 64 is connected to a conductive, plated via 65 which extends through body 62 to a conductive layer 68 on the bottom of the body. A VVM material 67 is placed in the gaps and later cured. A conformal coating 69 is then placed atop the VVM material 67. Some embodiments may not use a conformal coating. In this example, the conductive pads are thus on the top side of body 62 while the grounding connection will be made on the opposite, bottom side of the body.

Module 60 is designed for use with the connector depicted in FIG. 7. In this design, connector body 70 includes one or more electrodes 71, such as three electrodes for the three pads of the module. In one embodiment, these three electrodes may protect two data lines and an identification line for a connector and other devices beyond the connector. Electrode 71 includes a short portion 72 for mounting to a circuit board or other device, a longer portion 78 that is generally parallel to the short portion 72, and an end portion 79 that is formed at an angle to the longer portion. Central portion 74 is located between and at an angle to short and long portions 72, 78. Connector body 70 includes a pocket 73 into which the module 60 is inserted. In this design, the module is also at an angle to the appropriate portion 74 of electrodes 71.

Figure 8:
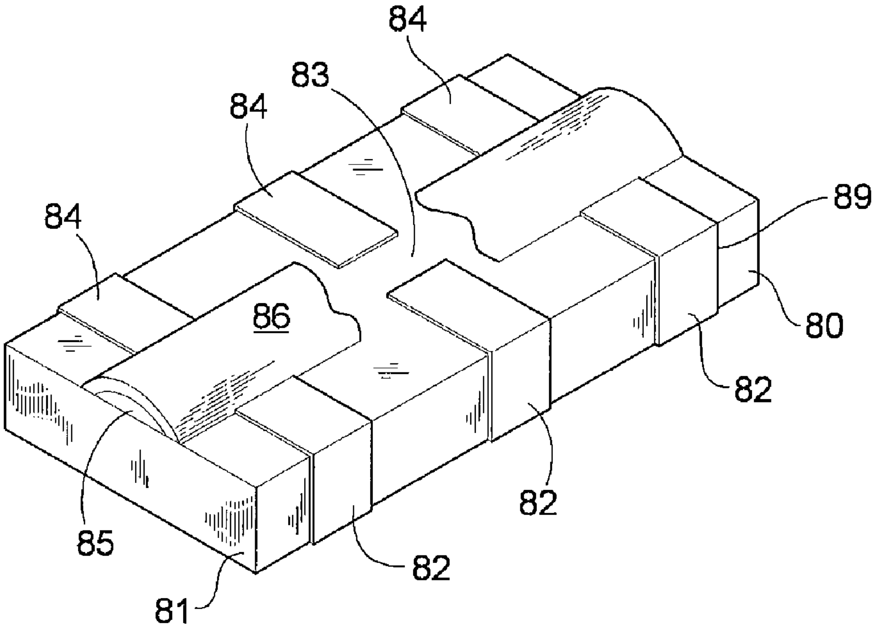
FIG. 8 is a side perspective view of a fourth embodiment of an electrical circuit protection device.
Figure 9:
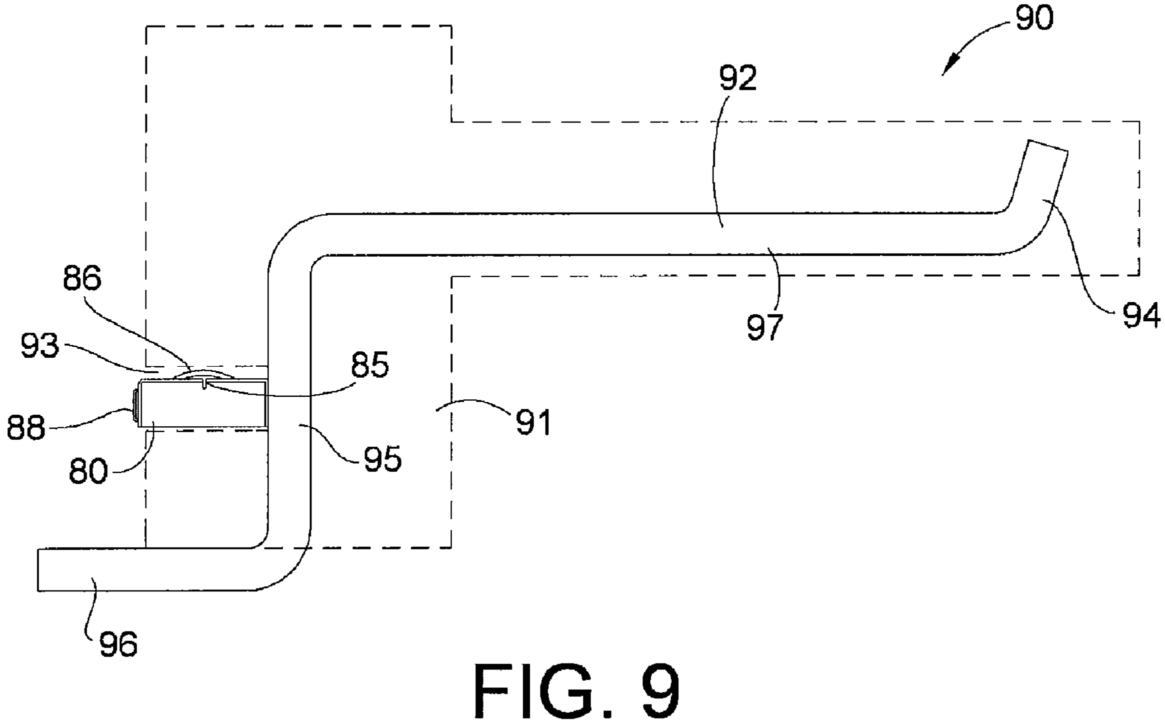
FIG. 9 is a side view of the electrical circuit protection device of FIG. 8 assembled to an electrical device.

Another embodiment of an array and an application is depicted in FIGS. 8-9. Array 80 includes an insulative body 81, a plurality of conductive traces 82 and an equal plurality of conductive pads or solder bumps 89 atop traces 82. Traces 82 are separated from a second plurality of conductive traces 84 by a series of gaps 83. The gaps are intended to be filled with VVM material 85, over which is formed a conformal coating 86. Traces 84 are joined into a grounding strap 88 on the left or back side of insulative body 81.

In this embodiment, module 80 is designed for insertion into pocket 93 of connector 90, as seen in FIG. 9. Connector 90 includes an insulative body 91 and a plurality of electrodes 92, of which only one is shown in FIG. 9. The electrode includes parallel short and long portions 96, 97 and a central perpendicular portion 95, to which one pad 89 of the array 80 connects. Terminal portion 94 of the electrodes is angled for easier connection to a cable or other device. As also seen in FIG. 9, pocket 93 is sufficiently large to accommodate module 80 even with a small raised height due to the VVM 85 and conformal coating 86.

Figure 10:
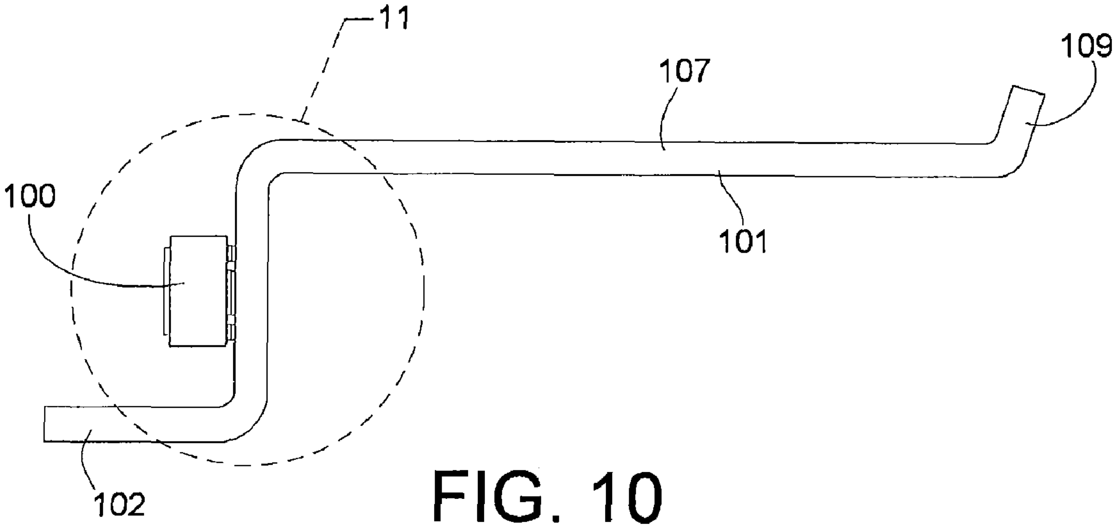
FIG. 10 is a side view of another embodiment.
Figure 11:
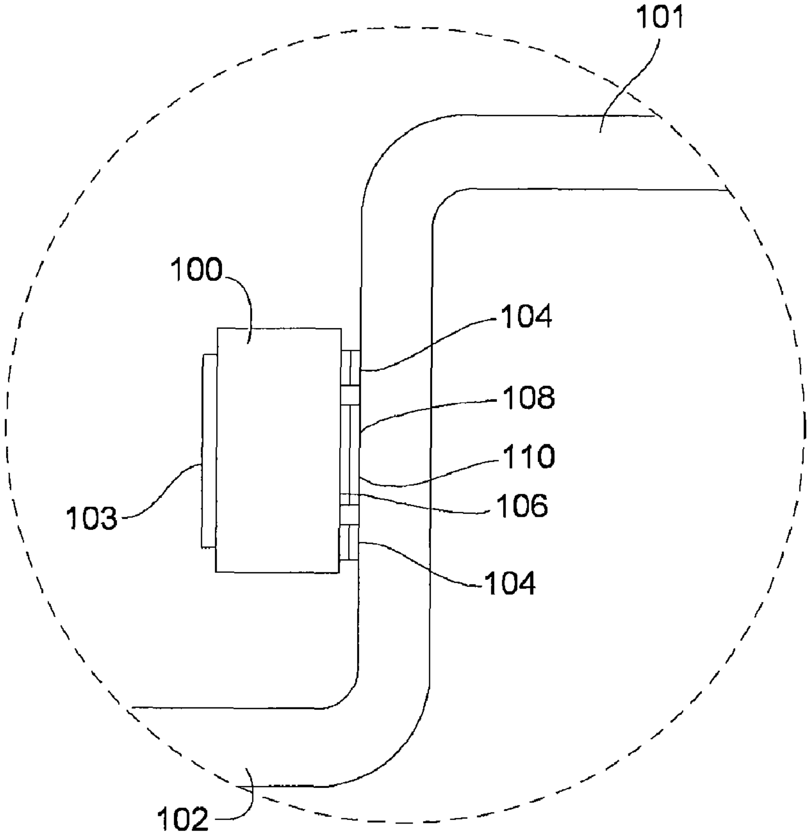
FIG. 11 is a more detailed view of the embodiment of FIG. 10.

Additional embodiments are depicted in FIGS. 10 and 11. In FIG. 10, an ESD array 100 is connected to a conductor or electrode 101 through one or more mechanical standoffs 104, which provide space 108 between the inner surface of the array and the surface of the electrode. A ground plate 103 on the bottom side of the array 100 is intended for connection to ground, while a conductor 106 on the top or opposite side of the array connects to electrode 101 via VVM 110 in the space 108. A conformal coating may also be used in the area of electrode 101 where the electrode is joined to VVM 110. As noted previously, the short end 102 of the electrode is the end which will receive heat when the electrodes are connected to an electrical device later in the process.

Fabrication of an ESD Array Joined to Electrodes

Figure 12:
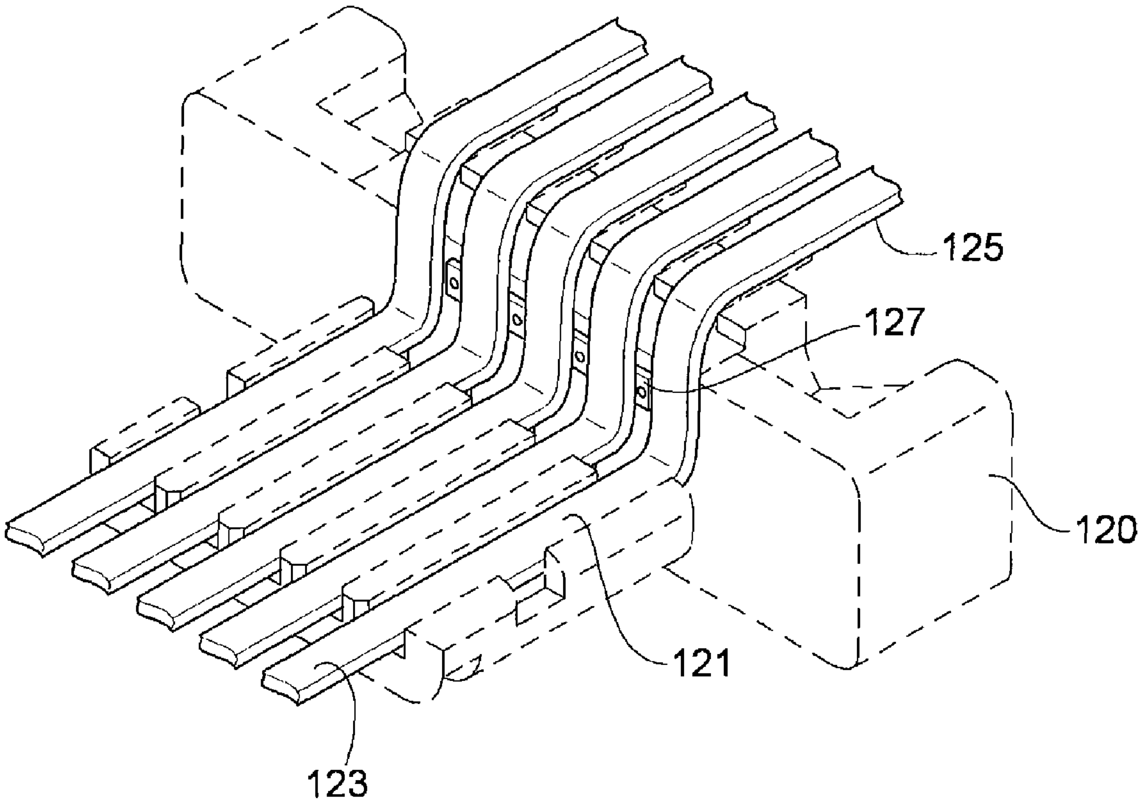
FIG. 12 is a perspective view of a connector which has been molded with electrodes and an ESD array already joined to the electrodes.

In addition to the embodiments discussed above, in which the ESD array may be added in a modular fashion to electrodes or to a connector, other embodiments may form an array and then mold it directly with the electrodes or to the connector. FIG. 12 depicts components for insert or other molding, with an outline of the connector into which they are molded shown in dashed lines.

Connector 120 (in dashed lines) is fabricated by first fabricating a series of electrodes 121 and also fabricating an array 127, as discussed above. The array 127 may then be joined to the electrodes 121, or in this embodiment, to three of the electrodes. The electrodes 121 and the array 127 to which they have been joined, as by soldering or other technique, are then insert molded. This may be accomplished by placing the joined electrodes and array into an injection molding tool. Alternatively, it may be accomplished by placing the joined components into a thermoforming tool or a compression molding tool.

As those who have skill in the art will recognize, these parts are typically, but not necessarily, very small, and net shaping or very near net shaping is a desirable economic feature of any such process. Thus, it may be necessary to shield the ends of the electrodes 121 from molding plastic, so that the ends need not be cleaned before they are soldered or otherwise joined to other components. The ground connection side of the array 127 should also be placed adjacent a surface of the tool used for injection or other molding, so that the connection side does not require extensive cleaning before the connector is assembled into a conductive housing or shield, as discussed above. In other embodiments, mold-release or other easily-removable, protective coating may be used to protect the surface so that minimal additional cleaning is needed.

Additional Array Embodiments with VVM Devices or Varistors

Figure 13:
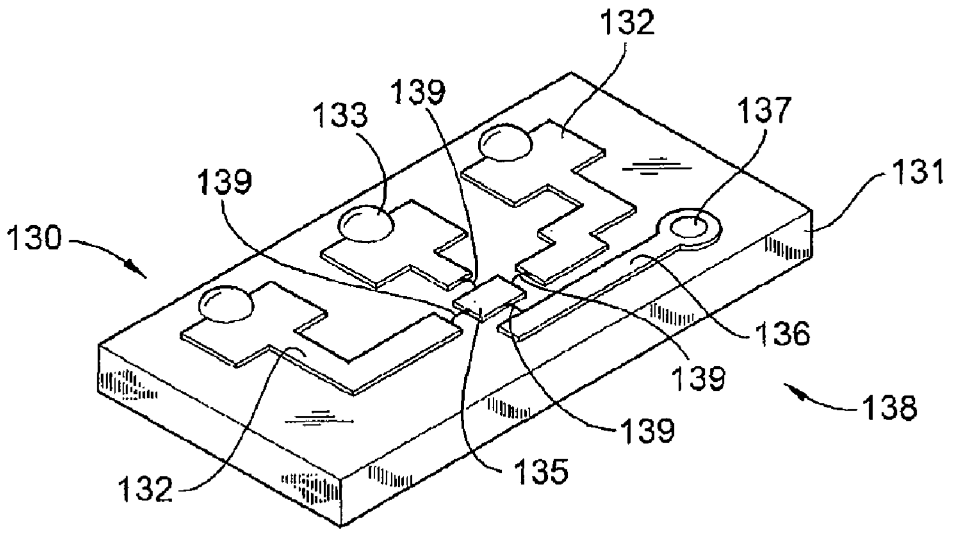
FIG. 13 is another embodiment of a protective array.

In addition to the arrays discussed above, other embodiments that use VVM devices, rather than strictly VVM materials, may also be fabricated and used. In FIG. 13, a chip-on-board semiconductor embodiment is depicted. The chip-on-board protective array 130 is similar in principle to the other arrays herein discussed, but a semiconductor protection device, such as a varistor, is used rather than VVM liquid or paste. Protective array 130 includes a substrate 131 and a plurality of traces 132 for connection to devices to be protected via solder bumps 133. Traces 132 connect to a combination varistor 135, which includes three protective varistor units, one for each of the protective devices to be connected via the traces 132 and solder bumps 133.

The connections between the traces 132 and the combination varistor 135 are made by bond wires 139. Varistors are electronic devices that have high resistance to voltage under normal operating conditions, but very low resistance when an ESD event occurs. See, e.g., U.S. Pat. Nos. 5,973,588; 6,214,685; 6,334,964; 6,522,515; and 6,547,597, which are hereby incorporated in their entirety and relied upon. The combination varistor 135 is then connected via conductor 136 to plated via 137 and to a conductive surface 138 on the underside of the substrate 131. The conductive surface on the underside is intended for connection to a shell and then to ground, as shown in FIG. 3, once array 130 is inserted into a pocket of a device or connector. In this instance, the gap between the conductor 136 and the bond wires 139 is filled by the combination varistor 135.

Besides varistors, other semiconductor devices may be suitable for an array application as described herein. These components may include, but are not limited to, gas discharge tubes (GDTs), Zener diodes, thyristors, bidirectional thyristors, tranzorbs, and silicone avalanche diodes (SADs).

Figure 14:
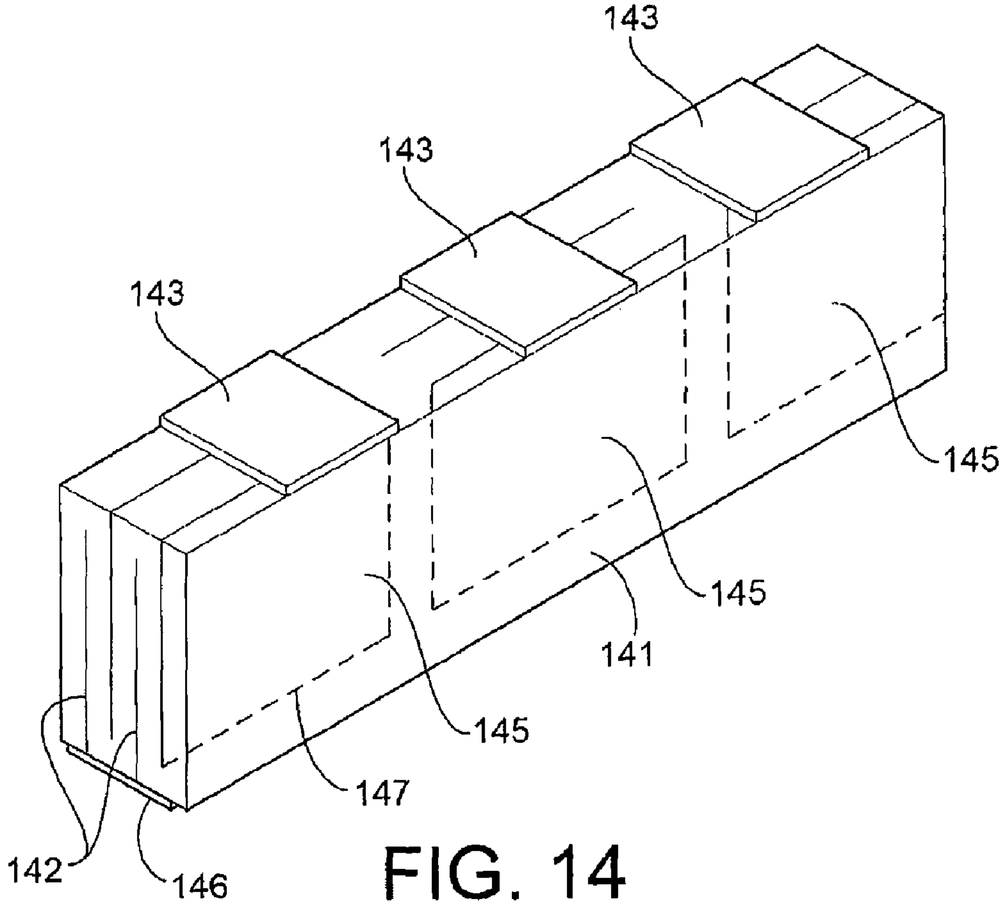
FIG. 14 is yet another embodiment of a protective array.

Another embodiment is depicted in FIG. 14. Varistor protective array 140 includes a multi-layer substrate 141, in this instance five layers of FR-4 fiberglass, ceramic, or other insulative material. Two of the layers include a conductive surface 142, such as a plating of metal, the conductive surfaces in contact with a ground contact 146 along the bottom of the substrate 141. Array 140 includes three conductive contacts 143, such as signal line contacts, for connection to circuits, such as signal circuits, requiring protection. Each of the signal line contacts is electrically connected to a varistor 145. The varistors are not physically in contact with the conductive surfaces 142 or bottom ground layer 146. Instead, the varistors 145 are placed near the conductive surfaces 142, 146 to form a capacitive connection with a conductive edge surface 147 of each varistor, with a very narrow void forming the dielectric layer of the capacitor thus formed. During normal operation, the capacitors do not conduct, but when an ESD event occurs, the capacitors conduct and relieve the ESD, preventing damage to the circuits which they are installed to protect. In this instance, the gaps between the contacts 143 and the ground conductors are filled with the varistors, by placing the varistors 145 sufficiently close to the ground conductors to form a capacitive connection.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method for manufacturing a connector, the method comprising:

forming a plurality of electrodes;

insert molding the plurality of electrodes into an insulative body having a pocket;

forming a discrete electrostatic discharge (ESD) protective array, the protective array comprising an insulated carrier, a plurality of contacts, and a ground conductor, wherein the plurality of contacts is connected to the ground conductor through a plurality of gaps filled with a voltage variable material (VVM) or a VVM device;

inserting the protective array into the pocket; and attaching the protective array to the plurality of electrodes to form a connector by placing the array and the body in a conductive housing, the array held in contact with a ground conductor by a spring-loaded or pressing connection.

2. The method of claim 1, wherein the electrodes of the connector are in touching but not penetrating contact with the plurality of contacts of the array.

3. The method of claim 2, wherein a first side of the array is electrically connected within the conductive housing by a solder connection and a second side of the array is electrically connected within the conductive housing by pressure.

4. The method of claim 1, wherein the plurality of contacts is formed by a method selected from the group consisting of plating a thickness and applying solder bumps.

5. The method of claim 1, further comprising coating the array with a conformal coating and curing the conformal coating.

6. The method of claim 1, further comprising subjecting the connector to heat to reflow solder, to cure the VVM, or to cure a conformal coating.

7. A method of forming an array, the method comprising:

forming an insulative housing;

forming a ground conductor on a first portion of the housing;

forming a plurality of contacts on a second portion of the housing, wherein the plurality of contacts are separated from the ground conductor by a plurality of gaps;

filling the plurality of gaps with a voltage variable material or a voltage variable material device; and if a voltage variable material is used, curing the voltage variable material, wherein the array is configured for modular insertion into an electrical device to provide ESD protection, the plurality of contacts configured for touching but not penetrating contact with leads of the electrical device.

8. The method of claim 7, wherein the plurality of contacts on the second portion are formed by plating, by attaching solder bumps, or by attaching the contacts.

9. The method of claim 7, wherein the plurality of contacts is formed on a first side of the housing and the ground conductor is formed on a second side of the housing.

10. The method of claim 7, further comprising inserting the array into the electrical device, and holding the array in electrical contact with a ground conductor via a pressing contact.

11. The method of claim 7, further comprising joining the array to a plurality of conductors and molding the joined array and plurality of conductors into a housing.

12. The method of claim 7, further comprising joining the array to a plurality of conductors and molding the joined array and plurality of conductors into a micro USB connector housing.

13. An electrical circuit protection device comprising:

an electrically insulating substrate;

at least one first electrical contact disposed on the substrate;

a plurality of second electrical contacts disposed on the substrate, the plurality of second electrical contacts being spaced apart from the at least one first electrical contact to form a plurality of gaps; and a voltage variable material or a voltage variable material device disposed in the plurality of gaps, the voltage variable material or voltage variable material device connecting the at least one first electrical contact to the plurality of second electrical contacts, wherein the electrical circuit protection device forms a discrete unit suitable for removable assembly into an electrical device to protect at least one circuit, the electrical circuit protection device configured for touching but not penetrating contact with a lead of the at least one circuit.

14. The device according to claim 13, further comprising an electrical device having an insulative housing with a pocket for insertion of the electrical circuit protection device, wherein the plurality of second electrical contacts is electrically connected to a plurality of electrodes within the electrical device, and further comprising a conductive housing around the insulative housing, wherein the first electrical contact is electrically connected to the conductive housing by pressure.

15. The device according to claim 13, wherein the electrical device is a miniature connector or a micro-USB connector, and further comprising the miniature connector or micro-USB connector.

16. The device according to claim 13, wherein the electrical circuit protection device is configured so that the electrical circuit protection device is removable from the electrical device without affecting a function of the electrical device other than protecting the at least one circuit.

17. The device according to claim 13, wherein the at least one first electrical contact and the plurality of second electrical contacts are located on a same side or on an opposite side of the substrate.

18. An electrical circuit protection device comprising:

a substrate;

first and second electrodes disposed on the substrate and spaced apart from one another to form a gap; and a voltage variable material or a voltage variable material device disposed on the substrate in the gap, the voltage variable material or voltage variable material device connecting the first electrode to the second electrode, wherein the electrical circuit protection device forms a discrete unit suitable for removable assembly into a pocket of an electrical device to protect at least one circuit connected to the electrical device, wherein the electrical circuit protection device is configured for connection to the at least one circuit or to a ground by a pressure connection.

19. The electrical circuit protection device of claim 18, further comprising the electrical device, and wherein the electrical circuit protection device is connected to the at least one circuit by soldering and to a ground by a pressure connection.

20. The electrical circuit protection device of claim 18, wherein the electrical circuit protection device is configured for touching but not penetrating contact with a lead of the at least one circuit.

21. The electrical circuit protection device of claim 18, wherein the first electrode is configured for connection to a ground and the second electrode comprises at least two second electrodes, the at least two second electrodes spaced on opposite sides of a top surface of the substrate and configured for connection to at least two circuits of the electrical device.

22. An electrical circuit protection device, comprising:

an electrically insulating substrate;

a first common electrode disposed on the substrate;

a plurality of second electrodes disposed on the substrate and spaced apart from and confronting the first common electrode to form a plurality of gaps; and a voltage variable material or a voltage variable material device disposed on the substrate in the plurality of gaps and connecting the first common electrode to the plurality of second electrodes, wherein the electrical circuit protection device is configured as a discrete device for insertion into and removal from an electrical component without affecting a fit or a function of the electrical device other than protection of the plurality of circuits.

23. The electrical circuit protection device of claim 22, further comprising the electrical component, and wherein the plurality of second electrodes is connected to the plurality of circuits by soldering and the first common electrode is connected to a ground by a pressure or spring-loaded connection.

24. The electrical circuit protection device of claim 22, further comprising a connector incorporating the protection device, wherein the connector is formed by soldering the protection device to a plurality of third electrodes and molding the soldered protection device and plurality of third electrodes into a connector.

25. The electrical circuit protection device of claim 22, wherein the VVM comprises a liquid or paste comprising a polymer and a plurality of particles; and wherein the VVM device comprises a VVM tape or a varistor or a semiconductor protection device.

* * * * *